Oct. 13, 1953
A. J. KUHN
2,655,602
ELECTRICAL APPARATUS, INCLUDING
PLURAL GENERATORS AND LOADS
Filed Dec. 29, 1951
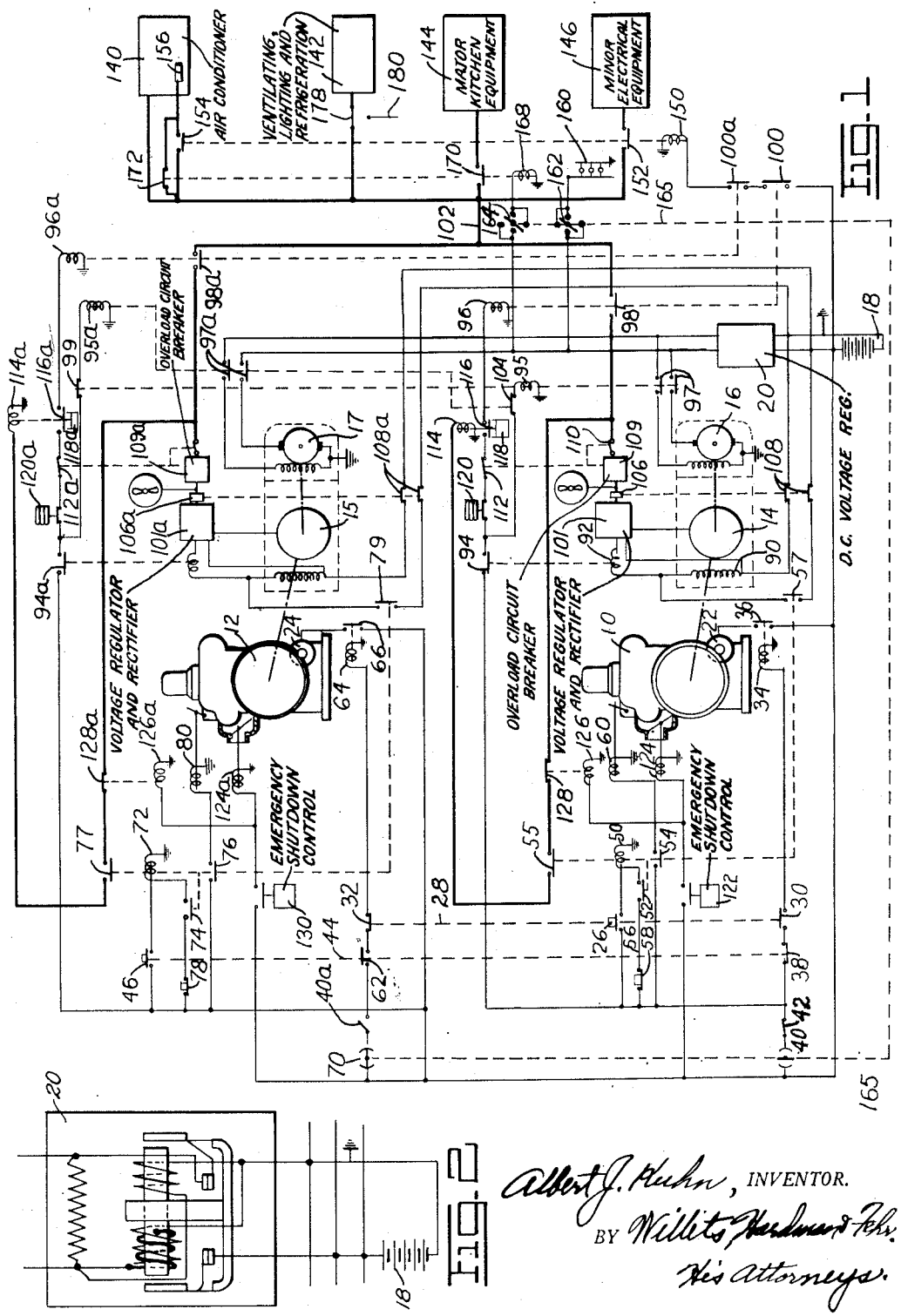
Albert J. Kuhn, INVENTOR.
BY Willets, *[signature]*
*His Attorneys*

Patented Oct. 13, 1953

2,655,602

UNITED STATES PATENT OFFICE 2,655,602

ELECTRICAL APPARATUS, INCLUDING PLURAL GENERATORS AND LOADS

Albert J. Kuhn, Dayton, Ohio, assignor to General Motors Corporation, Dayton, Ohio, a corporation of Delaware Application December 29, 1951, Serial No. 264,083

14 Claims. (Cl. 290—4)

This invention relates to electrical apparatus and more particularly to a system using a dual diesel power unit for supplying electrical energy for operating all of the electrical equipment on a modern air conditioned railway diner or the like.

It is an object of this invention to provide a system which is inexpensive, dependable and efficient in operation.

In certain types of installations such as modern railway dining cars which use electric hot plates, steamers, French fryers, etc., the electrical load varies considerably with the result that if one provides a single power unit having adequate capacity for supplying the entire electrical load during maximum demand, such a unit would be highly inefficient for generating the current required during low load periods.

It is an object of this invention to provide a system in which two separate power units are provided and wherein both units operate during maximum demand periods and only one unit operates under low load conditions.

Another object of this invention is to provide a simplified dual generation system, which eliminates the need for expensive duplication of controls.

Still another object of this invention is to provide a simple arrangement which makes it possible to utilize a single voltage regulator for regulating the output of either one of two direct current generators.

A further object of this invention is to provide a simple electrical interlock arrangement for preventing both of the diesel engines from being cranked simultaneously.

Still another object of this invention is to provide an arrangement in which the first direct current generator starts operating to supply all of the direct current load as long as that generator continues to operate and upon such generator becoming ineffective, the other generator will automatically pick up the direct current load.

Further objects and advantages of the present invention will be apparent from the following description, reference being had to the accompanying drawing wherein a preferred form of the invention is clearly shown.

In the drawing:

Figure 1 is a schematic circuit diagram showing the controls for use on a dual diesel operated generating system; and Figure 2 is a fragmentary schematic circuit diagram showing an illustrative form of battery charging regulator which may be used in the system shown in Figure 1 and also shows the relationship of the regulator with the storage battery.

Referring now to the drawing wherein there is shown somewhat schematically the control system for dual diesel power units, reference numerals 10 and 12 designate the first and second of two diesel engines which may be operated singly or in unison for generating electrical power. The engine 10 is adapted to drive an alternating current generator or alternator 14 and a direct current generator 16. Likewise, the engine 12 is adapted to drive an alternating current generator or alternator 15 and a direct current generator 17.

The alternating current generators supply current for the main load whereas the direct current generators primarily furnish current for the various control devices and serve to keep the storage battery 18 charged. The system contemplates using both alternating current generators during peak demands and alternating the load on the generators during successive low load periods. The load on the direct current generators is more constant with the result that only one of the direct current generators needs to be used to generate current at any one time.

In view of the above fact, only one of the direct current generators is ever connected into the circuit at any one time and the single voltage regulator 20 is used for regulating the battery charging operation at all times irrespective of which generator is connected in the circuit. Since voltage regulators of this type are well known in the art, the detailed construction of the same will not be described. Figure 2 of the drawing schematically shows one of many different kinds of voltage regulators which may be used for regulating the battery charging operation. For a more detailed description of this regulator, reference is hereby made to United States Patent 1,363,806 which shows and describes the construction and operation of this particular type of voltage regulator. For purposes of illustrating the invention, the direct current power lines have been shown as relatively light-weight lines throughout and the alternating current lines have been shown as relatively heavy lines. In order to simplify the disclosure, the alternating current lines have been represented by a single line whereas in actual practice a three phase system is used, and wherever necessary the single pole switches shown in the alternating current circuit would have additional poles to interrupt the additional lines. Since the electrical equipment connected to the alternating current lines is conventional equipment unless otherwise indicated, and is connected in the circuit in a conventional manner, the internal connections will not be shown.

The engines 10 and 12 have been provided with direct current cranking motors 22 and 24 respectively which are adapted to be energized from the storage battery 18 upon closing of the starter switches 26 and 46. Since cranking motors draw a relatively heavy current, suitable protective switches 30, 32, 38 and 62 have been tied in with the starting switches 26 and 46 as shown whereby it is impossible to energize both of the cranking motors simultaneously. Thus, the switches 30 and 32 are operated in unison with the starter switch 26, through a mechanical linkage 28. Upon closing of the switch 30, the relay 34 which controls the cranking motor switch 36 is energized so as to close the circuit to the cranking motor 22. It will be noted that the switch 30 is connected in series circuit relationship with switches 38, 40, and 42 so that unless switches 38, 40, and 42 are all closed the closing of switch 30 will not cause cranking of the diesel engine 10. The switch 42 is a safety switch which in actual practice would be mounted on or close to the diesel engine 10 for the benefit of any repairman who might be working on the diesel engine so that he could prevent someone at the main control panel which would be mounted in the car from starting the engine. The switch 38 is mechanically connected through the linkage 44 to the starting push button switch 46 for the diesel engine 12 with the result that if someone is trying to crank the diesel engine 12, the switch 38 will be held in the open position so as to prevent simultaneous starting of the diesel engine 10. The switch 40 is tied in with the main light switch in a manner to be explained hereinafter whereby under certain conditions the engine 10 cannot be operated when the diner is closed down and the lights turned off. It will be noted that the switch 32 serves to prevent energization of the cranking motor 24 when the push button starting switch 26 is held closed.

Closing of the starting switch 26 also energizes the solenoid 50 and this in turn causes closing of the switches 52, 54, 56 and 57. The switch 52 forms a part of a conventional holding circuit 56 in which the engine stopping switch 58 is located. Upon closing of the switch 54, the throttle control solenoid 60 is energized so as to prepare the diesel engine for operation. Once the diesel engine 10 is in operation, it may be stopped by pushing down on the push button 58 so as to break the holding circuit and thereby interrupt the flow of current to the relay 50 so as to open the switch 54 and thereby shut off the flow of fuel to the engine.

In order to start the diesel engine 12, one would push down on the switch button 46 so as to close the switch 62 which is arranged in circuit with the starting solenoid 64 which controls the starting switch 66 for the cranking motor 24. As explained hereinabove, closing of the switch 62 will be ineffective to energize the solenoid 64 if by chance push button switch 26 for the engine 10 is being held in closed position. As shown in the drawing, the push button switch 26 is mechanically connected to the switch 32 which is arranged in series circuit relationship with the switch 62. A safety switch 70 located on or near the engine is also provided in series circuit relationship with the switches 62 and 32. The safety switch 70 like the safety switch 42 is mounted down by the diesel engine 12 and may be opened by any repairman working on the engine.

Closing of the switch 46 closes the circuit to the solenoid 72 which controls the switches 74, 76, 77 and 79 as shown. The switch 74 is arranged in the holding circuit in series circuit relationship with the stop push button switch 78 with the result that opening of either the switch 78 or the switch 74 will cause deenergization of the solenoid 72. Upon closing of the switch 79, the engine throttle solenoid 80 is energized.

Under normal conditions, when the diner is first put into use, both engines are placed into operation and both of the alternating current generators function as generators but only the first one of the direct current generators to be placed in operation functions to supply direct current to the direct current portion of the system. Thus, in the event that diesel engine 10 is placed into operation first, the direct current generator 16 will then serve to generate current for charging the battery and for energizing the various direct current equipment on the car. But in the event that the diesel engine 10 is stopped for any reason whatsoever before the diesel engine 12 stops, control means are provided for automatically causing the direct current generator 17 to take over as a generator for supplying the necessary direct current to the system. These controls will be described in greater detail hereinafter.

Again assuming that the engine 10 is the first one of the engines to be started, this engine will drive the generators 14 and 16 at a speed high enough to cause these generators to properly function. Upon closing the starter switch 26 which initiates operation of the engine 10, the solenoid 50 will be energized as explained hereinabove and this causes the switch 57, which is located in the line leading from the battery 18 to the alternator field 90, to close so as to connect the alternator field 90 to the battery 18 until such time as the alternator is capable of generating the necessary current for its own field excitation. A conventional voltage regulator 101 which is preferably of the so-called static regulator type serves to regulate the voltage of the alternator 14 in accordance with well-known practice. During normal operation, rectified current is supplied from the voltage regulator unit 101 to the field winding 90. Inasmuch as voltage regulators of this type are well known in the art, it will not be necessary to show or describe the details of the same.

When the alternator voltage reaches a predetermined value, the solenoid 92 located in the line leading from the voltage regulator to the field coil 90 will be energized so as to close the switch 94. In the event the alternator 14 should fail to generate current for any reason whatsoever, the solenoid 92 would open the switch 94. A break in the field winding 90, for example, would cause the switch 94 to open and thereby disconnect the generators 14 and 16 from the rest of the system. Closing of the switch 94 sets up a circuit for supplying direct current for the energization of the solenoids 95 and 96. The solenoid 95 operates the switches 97 and 99 whereas the solenoid 96 operates the switches 98 and 100. (All of the switches shown in the drawing have been shown in the position which they would occupy when the system is shut down completely. In those cases where the switches are operated by solenoids, the energization of any particular solenoid would cause every switch operated thereby to be shifted whereby those switches shown in the open position would be closed, and those switches shown in the closed position would be opened.)

Closing of the switch 97 serves to connect the direct current generator 16 to the direct current power lines with the result that this generator will supply direct current for charging the battery and for operating the various controls, but the switch 97 will only be closed if the generator 17 is not connected to the direct current lines. In describing the above sequence of operation, it is assumed that the switch 104, which is arranged in series circuit relationship with the solenoid 95, is in the closed position. For reasons to be explained more fully hereinafter, the switch 104 is always in the closed position when the diesel engine 12 is not in operation. However, if the diesel engine 12 were placed in operation before the diesel engine 10 were placed in operation and was still running, the switch 104 would have been opened so as to prevent energization of the solenoid 95 and consequently prevent closing of the switch 97. Whenever the engine 10 is started first and the solenoid 95 is energized, the switch 99 will be opened so as to prevent the generator 17 from being connected into the circuit as long as the generator 16 is properly functioning. However, if the engine 10 or the generator 14 driven thereby should for any reason cease to function, the solenoid 95 would become deenergized so as to disconnect the generator 16 from the load and so as to close the switch 99 whereby the generator 17 could come into operation.

A current responsive control element 106 is placed in the main output line leading from the alternating current regulator 101 and serves to operate the switch 108 so as to disconnect the alternator field 99 from the battery when the output of the alternator is sufficient to supply necessary current for field excitation. A circuit breaker 109 is provided in the output power line as shown so as to open the switches 110 and 112 in the event that the circuit breaker is overloaded.

Means are provided whereby the alternator 14 is not connected to the main power line 102 immediately after the engine 10 starts. As explained hereinabove, a switch 55 operated by the main starting solenoid 50 is located in a line leading to the output of the alternator 14 and this switch serves to connect a time delay solenoid 114 into the circuit. The solenoid 114 operates a switch 116 which does not close instantaneously due to the air dashpot 118. The purpose of this dashpot is to delay the closing of the switch 98 for a sufficient period of time to make sure that the connection of the alternator to the main power line 102 will not cause stalling of the diesel. The dashpot 118 is of the type which permits instantaneous reopening of the switch 116 when the solenoid 114 is deenergized.

Suitable protective devices have been provided for automatically shutting down either one of the units in the event of an emergency. Thus, an oil pressure operated switch 120 located in the fuel line has been provided in the line leading to the solenoid 96 so as to interrupt the flow of current to the solenoid in the event of fuel failure. Reference numeral 122 is intended to designate conventional protective devices such as overheating, low lubricating oil pressure and/or overspeeding safety devices which would come into play to shut down the engine 10 in an emergency. Upon the safety device 122 coming into operation, the solenoid 124 which operates the air damper of the engine 10 would be energized and also the solenoid 126 which operates the switch 128 would be energized.

In effect, two separate generating units or systems have been provided, either one or both of which may be placed into operation. For convenience of description, the one system operated by the diesel engine 10 will be referred to as the first unit and the other will be referred to as the second unit. In order to avoid needless repetition, those control elements associated with the second unit which have not been described hereinabove but which function in the same manner as the corresponding control elements of the first unit, will be designated by the same reference numerals as the corresponding control elements in the first unit, but the reference characters $a$ have been added after the reference numerals so used so as to enable one to distinguish between the controls for the two units. Unless otherwise indicated, the corresponding control elements are identical in construction and function in both generating units.

The entire electrical load on the alternating current power lines may be arbitrarily divided into two main portions which may be referred to as primary loads and secondary loads. The primary loads may for example include the ventilating and air conditioning apparatus, refrigerator, hot plate, dish washer, lights, etc., which constitute the minimum equipment necessary for serving meals. The secondary loads on the other hand may include the vegetable steamer, French fryer, and other accessories which do not require power at night and are not of sufficient importance to require their use in the event of an emergency shutdown of one of the other of the generating units.

The conventional power consuming units on a modern railway diner are of the type designed to operate on standard 115 and 230 volt alternating current power. It is to be understood that the alternators shown herein will supply standard 115 and 230 volt power. The main power consuming units diagrammatically illustrated herein consist of an air conditioning system 140, ventilation, lighting and refrigeration equipment generally designated by the reference numeral 142, miscellaneous kitchen equipment such as a hot plate, dish washer and so forth which have been generally designated by the reference numeral 144. The equipment designated by the reference numeral 140, 142, and 144 may be termed primary equipment and constitutes the primary load on the alternators 14 and 15. In addition to the primary load, there is the secondary load which has been indicated by the reference numeral 146 and which is intended to designate equipment such as the vegetable steamer, the French fryer and similar minor electrical equipment.

Automatic means have been provided for disconnecting the secondary loads from the system at all times when only one diesel engine is in operation. Thus, the control solenoids 96 and 96a operate switches 100 and 100a respectively both of which are arranged in series with a solenoid 150 which must be energized in order to close the main switch 152 leading to the secondary loads and the switch 154 leading to an unloader control 156 for the air conditioning unit. In other words, deenergization of either one of the solenoids 96 or 96a resulting from the shutdown of either generating system would automatically cause opening of the switches 152 and 154.

The air conditioning power requirements may be reduced in an emergency or for nighttime operation in any of several well known ways. A preferred arrangement would be to unload half of the cylinders of a multiple cylinder compressor in the manner indicated in Gould Patent 2,338,240. The unloading control mechanism 156 may be of any conventional type but is preferably of the type shown in said Gould patent to which reference is hereby made for a more complete disclosure. Since the details of the unloading mechanism are not an essential part of the invention and since unloaders of this type are well known in the art, the unloader has not been shown except in a diagrammatic manner.

In order to avoid needless operation of both diesel engines at any time when the diner is completely shut down, and in order to distribute the wear between the engines, automatic means have been provided for shutting off a different diesel engine each time the kitchen lights 160 are turned off on the diner. Since the chef will turn off the kitchen lights each night when the diner is no longer in use, it has been found that it is practical to provide a multiple switch having contactors 162 and 164 which are mechanically interconnected with the engine control switches 40 and 70 as indicated by the dotted line 165. Since it is not the purpose to turn off both engines each night, the switching arrangement is so constructed and arranged whereby each successive time that the kitchen lights are turned off a different engine will be turned off. For purposes of illustration the switches 162, 164, 40, and 70 have been shown as rotary switches wherein successive operations through arcs of 45 degrees change the circuit connections so as to produce the above described results.

The switch 164 serves to control the solenoid 168 which in turn operates through the switch 170 to disconnect the load 144 when the kitchen lights are turned off. This is not only a safety feature but also serves to reduce the load on the single alternator which is in operation at night. The solenoid 168 also controls a switch 172 which is arranged in parallel with the air conditioning unloader switch 154 and which serves to close the circuit to the unloader so as to allow full capacity operation of the air conditioning equipment at night. By shutting down the secondary loads 146 and the primary loads 144 there is enough generator capacity to handle the air conditioning equipment in the fully loaded condition.

There are times when the diner will be placed on a siding where standby power is available. Under such conditions the only pieces of equipment which generally need to be used are those designated by the reference numeral 142 and consequently a switch 178 is used for disconnecting the equipment 142 from the power line 102 and for connecting this equipment to the standby power line 180.

While the form of embodiment of the invention as herein disclosed constitutes a preferred form, it is to be understood that other forms might be adopted as may come within the scope of the claims which follow.

What is claimed is as follows:

1. In combination, a first alternating current generator, a second alternating current generator, means for driving said first and said second alternating current generators, an alternating current power distributing system including a primary load and a secondary load, means for connecting said alternating current generators in parallel to said alternating current power system, and means responsive to failure of one of said generators to disconnect said secondary load from said power system.

2. In combination, a first alternating current generator, a second alternating current generator, a first engine for operating said first alternating current generator, a second engine for operating said second alternating current generator, an alternating current power distributing system, means for connecting said generators to said alternating current power distributing system, a first direct current generator driven by said first engine, a second direct current generator driven by said second engine, a direct current distribution system including a battery and a voltage regulator, and means responsive to the starting of one of said engines for connecting the direct current generator driven thereby to said direct current distribution system and for preventing the other of said direct current generators from being connected simultaneously to said direct current distribution system.

3. In a dual generator system, a first alternating current generator, a second alternating current generator, an alternating current power system, means for connecting said first and second alternating current generators to said alternating current power system, a first direct current generator, a second direct current generator, a first engine for operating said first alternating current generator and said first direct current generator, a second engine for operating said second alternating current generator and said second direct current generator, a direct current distribution system, means for selectively connecting either one of said direct current generators to said direct current distribution system and for preventing connection of the other of said direct current generators to said direct current distribution system.

4. In a dual generator system, a first alternating current generator, a second alternating current generator, an alternating current power system, means for connecting said first and second alternating current generators to said alternating current power system, a first direct current generator, a second direct current generator, a first engine for operating said first generator, a second engine for operating said second generator, a direct current distribution system, means for selectively connecting either one of said direct current generators to said direct current distribution system and for preventing connection of the other of said direct current generators to said direct current distribution system, and means responsive to the stoppage of the direct current generators which is connected to said direct current distribution system to connect the other of said direct current generators to said direct current distribution system.

5. In combination, a first alternating current generator, a second alternating current generator, a first engine for operating said first alternating current generator, a second engine for operating said second alternating current generator, an alternating current power system, means for connecting said generators to supply power to said alternating current power system, a first direct current generator, a second direct current generator, a direct current distribution system including a voltage regulator, means for selectively connecting either one of said direct current generators to said direct current distribution system, a first cranking motor for said first engine, a second cranking motor for said second engine, means for selectively connecting each of said cranking motors to said direct current distribution system to crank the engine associated therewith including means for preventing simultaneous energization of both of said cranking motors.

6. In combination, a first alternating current generator, a second alternating current generator, a first engine for operating said first alternating current generator, a second engine for operating said second alternating current generator, an alternating current power system, means for connecting said generators to supply power to said alternating current power system, said alternating power system including a primary load and a secondary load, and means responsive to stoppage of one of said alternating current generators for disconnecting said secondary load, a first direct current generator, a second direct current generator, a direct current distribution system including a voltage regulator and a storage battery, means for selectively connecting either one of said direct current generators to said direct current distribution system, a first cranking motor for said engine, a second cranking motor for said second engine, means for selectively connecting each of said cranking motors to said direct current distribution system to crank the engine associated therewith including means for preventing simultaneous energization of both of said cranking means.

7. In combination, a first alternating current generator, a second alternating current generator, a first engine for operating said first alternating current generator, a second engine for operating said second alternating current generator, an alternating current power system, means for connecting said generators to supply power to said alternating current power system, a first direct current generator, a second direct current generator, a direct current distribution system including a voltage regulator and a storage battery, means for selectively connecting either one of said direct current generators to said direct current distribution system, said alternating current power system including a plurality of individually controlled loads, and means responsive to the disconnection of one of said loads from said power system for preventing the operation of both of said engines.

8. In a railway car diner, an electrical load, an alternating current power distribution system for supplying electrical energy to said electrical load, a first alternating current generator, a second alternating current generator, a first engine for operating said first alternating current generator, a second engine for operating said second alternating current generator, means for connecting said alternating current generators in parallel to said alternating current power distribution system, a first direct current generator drivingly connected to said first engine, a second direct current generator drivingly connected to said second engine, a direct current distribution system including a voltage regulator and a storage battery, means responsive to initiation of operation of a first one of said engines for connecting the direct current generator driven thereby to said direct current distribution system and for preventing connection of the other of said direct current generators to said direct current distribution system.

9. In a railway car diner, an electrical load, an alternating current power distribtion system for supplying electrical energy to said electrical load, a first alternating current generator, a second alternating current generator, a first engine for operating said first alternating current generator, a second engine for operating said second alternating current generator, means for connecting said alternating current generators in parallel to said alternating current power distribution system, a first direct current generator drivingly connected to said first engine, a second direct current generator drivingly connected to said second engine, a direct current distribution system including a voltage regulator and a storage battery, means responsive to initiation of operation of a first one of said engines for connecting the direct current generator driven thereby to said direct current distribution system and for preventing connection of the other of said direct current generators to said direct current distribution system, and means responsive to stoppage of one of said engines for reducing the power requirements of said electrical load.

10. In a railway car diner, a hot plate, air conditioning equipment, lighting means, an alternating current power system for supplying electrical energy to said hot plate, air conditioning equipment and said lights, a first alternating current generator, a second alternating current generator, a first engine for operating said first alternating current generator, a second engine for operating said second alternating current generator, means for connecting said alternating current generators in parallel to said alternating current power system, a first direct current generator drivingly connected to said first engine, a second direct current generator drivingly connected to said second engine, a direct current distribution system including a voltage regulator, means responsive to initiation of operation of one of said engines for connecting the direct current generator driven thereby to said direct current distribution system and for preventing connection of the other of said direct current generators to said direct current distribution system, and means responsive for disconnection of said lights from said alternating current power system for stopping one of said engines.

11. In combination, a first alternating current generator, a second alternating current generator, means for driving said first and said second alternating current generators, an alternating current power distributing system, a series of primary power consuming devices including an air conditioning apparatus connected to said power distributing system and a series of secondary power consuming devices connected to said power distributing system, means responsive to stoppage of one of said generators for disconnecting said secondary devices from said distribution system, and means for reducing the power input to said air conditioning apparatus in response to stoppage of said one generator.

12. In combination, a first alternating current generator, a second alternating current generator, means for driving said first and said second alternating current generators, an alternating current power distributing system, a series of primary power consuming devices including air conditioning apparatus connected to said power distributing system, a second series of secondary power consuming devices connected to said power distributing system, means responsive to stoppage of one of said generators for disconnecting said secondary devices from said power distributing system, means for reducing the power input to said air conditioning apparatus in response to stoppage of said one generator, and means for disconnecting said secondary devices from said power distributing system including means for increasing the power supply to said air conditioning apparatus.

13. In a railway car, a first generator, a second generator, a first engine for operating said first generator, a second engine for operating said second generator, an alternating current power distributing system, a first series of primary power consuming devices including an air conditioning unit connected to said power distributing system, means for restricting the supply of power to said air conditioning unit, a series of secondary power consuming devices, means responsive to stoppage of one of said engines for disconnecting said secondary power consuming devices and for reducing the power input to said air conditioning unit, and means responsive to disconnection of a portion of said primary power consuming devices for rendering said last named means ineffective to reduce the power input to said air conditioning unit.

14. In combination, a first alternating current generator, a second alternating current generator, means for driving said first and second alternating current generators, an air conditioning unit, first power line means for supplying electrical power from said generators to said air conditioning unit, second power line means for supplying electrical energy from said generators to a control device for reducing the power consumed by said air conditioning equipment, a pair of switches arranged in parallel relationship in said second power line means for controlling the flow of current to said control device, primary and secondary power consuming means connected to the output of said generators, means for deenergizing certain of said power consuming means, means responsive to the stoppage of one of said engines for opening one of said switches, and means responsive to operation of said last named means for opening the other of said switches.

ALBERT J. KUHN.

References Cited in the file of this patent

UNITED STATES PATENTS

| Number | Name | Date |
|---|---|---|
| Re. 12,526 | Rateau et al. | Aug. 28, 1906 |
| Re. 23,444 | Nettel | Dec. 18, 1951 |
| 1,504,014 | Axtell | Aug. 5, 1924 |
| 1,544,780 | Shoemaker et al. | July 7, 1925 |
| 1,662,366 | Cosgray | Mar. 13, 1928 |
| 1,777,668 | Goldsmith | Oct. 7, 1930 |
| 2,183,364 | Bailey | Dec. 12, 1939 |
| 2,338,240 | Gould | Jan. 4, 1944 |
| 2,451,976 | Reagan et al. | Oct. 19, 1948 |

FOREIGN PATENTS

| Number | Country | Date |
|---|---|---|
| 370,952 | Great Britain | Apr. 4, 1932 |